US012507006B2

(12) United States Patent
Hanley et al.

(10) Patent No.: US 12,507,006 B2
(45) Date of Patent: Dec. 23, 2025

(54) SYSTEM AND METHOD FOR PRIVATE AUDIO CHANNELS

(71) Applicant: Universal City Studios LLC, Universal City, CA (US)

(72) Inventors: Kyle Hanley, Orlando, FL (US); John David Smith, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 591 days.

(21) Appl. No.: 17/538,612

(22) Filed: Nov. 30, 2021

(65) Prior Publication Data

US 2022/0182760 A1 Jun. 9, 2022

Related U.S. Application Data

(60) Provisional application No. 63/121,550, filed on Dec. 4, 2020.

(51) Int. Cl.
*H04R 3/12* (2006.01)
*G02B 27/01* (2006.01)
(Continued)

(52) U.S. Cl.
CPC ........... *H04R 3/12* (2013.01); *G02B 27/0176* (2013.01); *G06K 7/10366* (2013.01); *H04L 65/403* (2013.01)

(58) Field of Classification Search
None
See application file for complete search history.

(56) References Cited

U.S. PATENT DOCUMENTS 6,060,847 A 5/2000 Hettema et al.
8,457,367 B1 6/2013 Sipe et al.
(Continued)

FOREIGN PATENT DOCUMENTS

EP 0691146 A1 1/1996
EP 2347809 A1 7/2011
(Continued)

OTHER PUBLICATIONS

PCT/US2021/061641 International Search Report and Written Opinion mailed Apr. 12, 2022.
(Continued)

*Primary Examiner* — Duc Nguyen
*Assistant Examiner* — Assad Mohammed
(74) *Attorney, Agent, or Firm* — Fletcher Yoder, PC

(57) ABSTRACT

A system includes a plurality of guest interface devices including a radio frequency identification (RFID) tag associated with each of the guest interface devices. The system includes a plurality of head-mounted displays and an audio distribution system. The audio distribution system includes a RFID reader and a processor to receive guest interface device identification information encoded in an identification tag associated with a guest interface device and designate a private audio channel for an assigned group of the guest interface device. The system includes a head-mounted display that reads the identification tag to associate the head-mounted displayed with the assigned group of the guest interface device. The system transmits audio between head-mounted devices in the assigned group via the designated private audio channel.

20 Claims, 7 Drawing Sheets

(51) Int. Cl.

| | |
|---|---|
| ***G06K 7/10*** | (2006.01) |
| ***H04L 65/403*** | (2022.01) |

(56) References Cited

U.S. PATENT DOCUMENTS

| | | | | |
|---|---|---|---|---|
| 8,812,954 | B2 | 8/2014 | Shuster et al. | |
| 9,275,269 | B1 | 3/2016 | Li et al. | |
| 9,305,292 | B1 * | 4/2016 | Skelding | G06Q 20/18 |
| 9,313,455 | B1 * | 4/2016 | Moeeni | H04N 7/147 |
| 9,339,728 | B2 | 5/2016 | Sullivan et al. | |
| 9,818,225 | B2 | 11/2017 | Mao et al. | |
| 10,086,279 | B2 | 10/2018 | Dun et al. | |
| 11,036,055 | B2 | 6/2021 | Ninan et al. | |
| 2004/0205191 | A1 * | 10/2004 | Smith | H04L 69/329 709/227 |
| 2006/0221937 | A1 * | 10/2006 | Olivier | H04H 20/57 370/352 |
| 2007/0208942 | A1 * | 9/2007 | May | H04L 69/329 713/168 |
| 2008/0251575 | A1 * | 10/2008 | Bowling | H04N 5/77 235/375 |
| 2014/0214571 | A1 * | 7/2014 | Pedley | G06Q 20/202 705/21 |
| 2014/0337921 | A1 * | 11/2014 | Hanna, Jr. | H04L 63/107 726/3 |
| 2015/0199064 | A1 * | 7/2015 | Cho | G02B 27/0179 345/173 |
| 2016/0198252 | A1 * | 7/2016 | Sun | H04R 1/1041 381/74 |
| 2017/0072316 | A1 * | 3/2017 | Finfter | A63F 13/573 |
| 2019/0355049 | A1 * | 11/2019 | Kulkarni Wadhonkar | G06Q 20/12 |
| 2020/0093362 | A1 * | 3/2020 | Jackson | G02B 27/0172 |
| 2020/0112711 | A1 * | 4/2020 | Enriquez | G06T 19/006 |
| 2021/0016185 | A1 * | 1/2021 | Linguanti | A63G 31/00 |
| 2022/0014839 | A1 * | 1/2022 | Tartz | G10K 11/17837 |

FOREIGN PATENT DOCUMENTS

| | | | |
|---|---|---|---|
| EP | 3470604 | A1 | 4/2019 |
| JP | 2017063844 | A | 4/2017 |

OTHER PUBLICATIONS

JP Office Action for Japanese Application No. 2023-532692 mailed Oct. 30, 2025.

* cited by examiner

SYSTEM AND METHOD FOR PRIVATE AUDIO CHANNELS

CROSS-REFERENCE TO RELATED APPLICATIONS

This application claims priority to and the benefit of U.S. Provisional Patent Application No. 63/121,550, entitled "SYSTEM AND METHOD FOR PRIVATE AUDIO CHANNELS", filed Dec. 4, 2020, which is herein incorporated by reference in its entirety.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include various entertainment attractions that are useful in entertaining guests. The entertainment attractions of the amusement park may have different noise levels that may make it difficult to communicate with other guests in a party. It is recognized that it may be desirable to enhance the audio experience for guests within the entertainment attractions.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an audio channel system includes a guest interface device including a radio frequency identification (RFID) tag associated with the guest interface device. The RFID tag includes encoded device identification information of the guest interface device. The system includes a head-mounted display comprising a head-mounted display RFID reader configured to read the RFID tag of the guest interface device, when coupled to the head-mounted display, to receive the device identification information corresponding to the guest interface device. The system includes an audio distribution system having an RFID reader configured to read the RFID tag of the guest interface device to receive the device identification information of the RFID tag. The audio distribution system includes a processor configured to receive a group assignment of the guest interface device and associate the group assignment with the device identification information read by the RFID reader. The processor is also configured to receive the device identification information and head-mounted display information from the head-mounted display, associate the head-mounted display with the group assignment of the guest interface device' designate a private audio channel to the group assignment of the head-mounted display, and generate instructions to transmit audio to and from the head-mounted device using the private audio channel.

In an embodiment, a method for managing one or more private audio channels is provided that includes receiving guest interface device identification information encoded in a radio frequency identification (RFID) tag associated with a guest interface device. The method also includes assigning the guest interface device identification information into a group, receiving head-mounted device identification that indicates that a head-mounted device is coupled to the guest interface device, designating a private audio channel for the assigned group, and communicating audio signals between the head-mounted device and other head-mounted devices in the assigned group via the designated private audio channel.

In an embodiment, a head-mounted device is provided that includes a guest interface device that has an identification tag that encodes guest interface device identification information. The head-mounted device includes a head-mounted display configured to couple to the guest interface device. The head-mounted device includes a reader configured to read the guest interface device identification information from the identification tag. The head-mounted device also includes communication circuitry configured to transmit the guest interface device identification information and head-mounted device identification to a controller. The head-mounted device further includes a speaker configured to output audio signals of a private audio channel associated with the guest interface device.

DRAWINGS

These and other features, aspects, and advantages of the present disclosure will become better understood when the following detailed description is read with reference to the accompanying drawings in which like characters represent like parts throughout the drawings, wherein.

Figure 1:
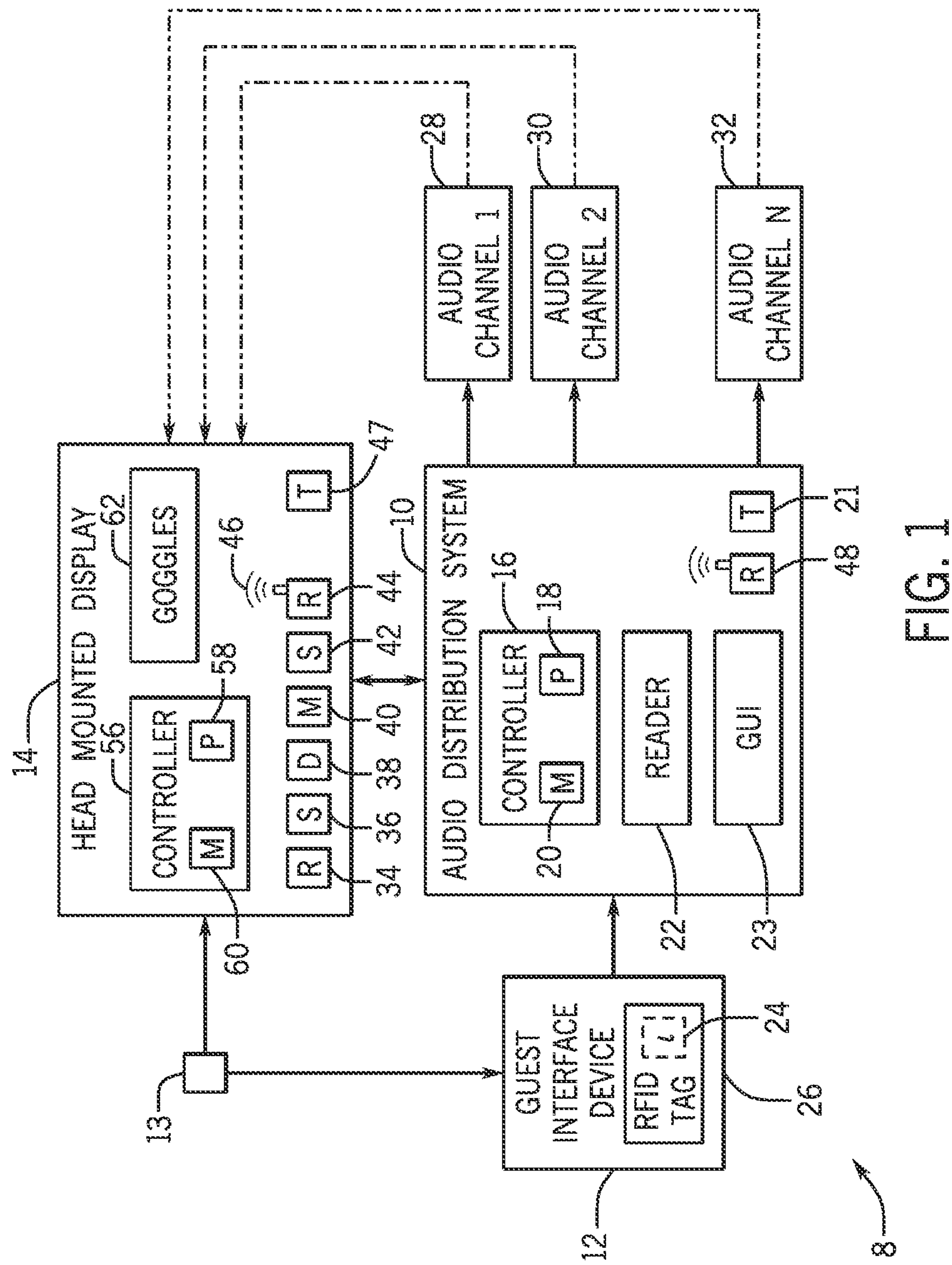
FIG. 1 is a block diagram of an audio distribution system that incorporates a guest interface device and a head-mounted device, according to embodiments of the present disclosure.
Figure 6:
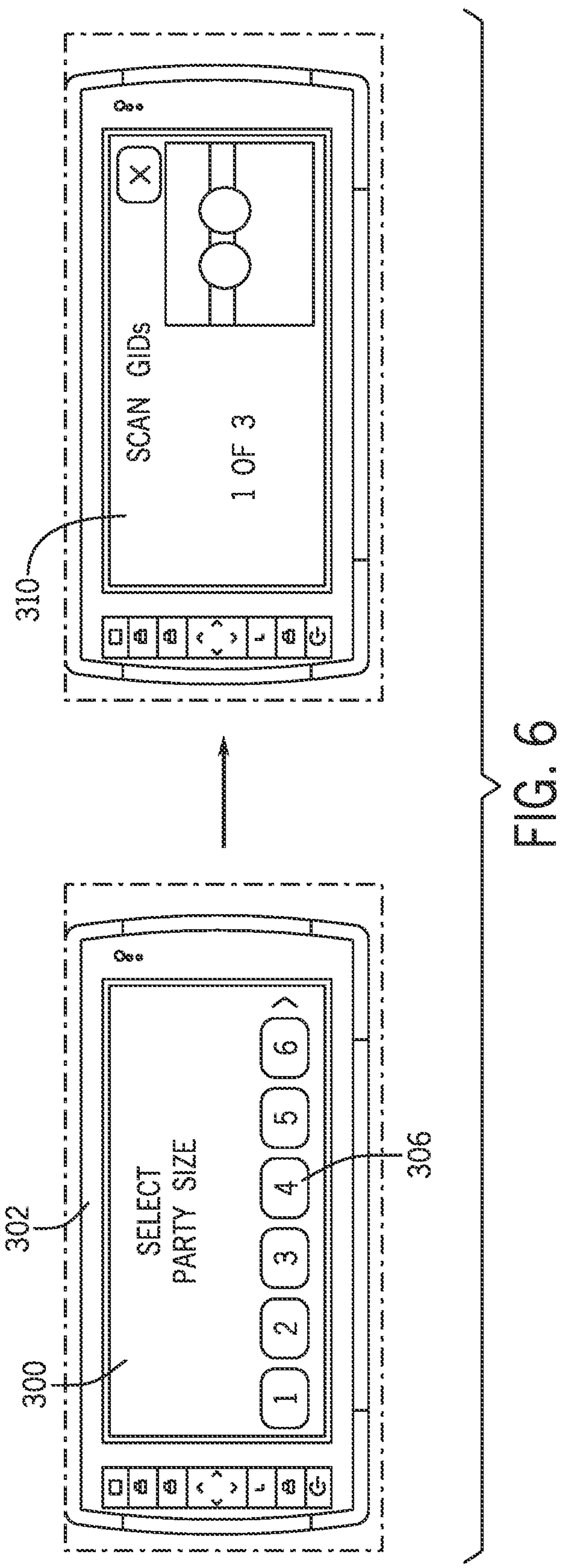
Figure 7:
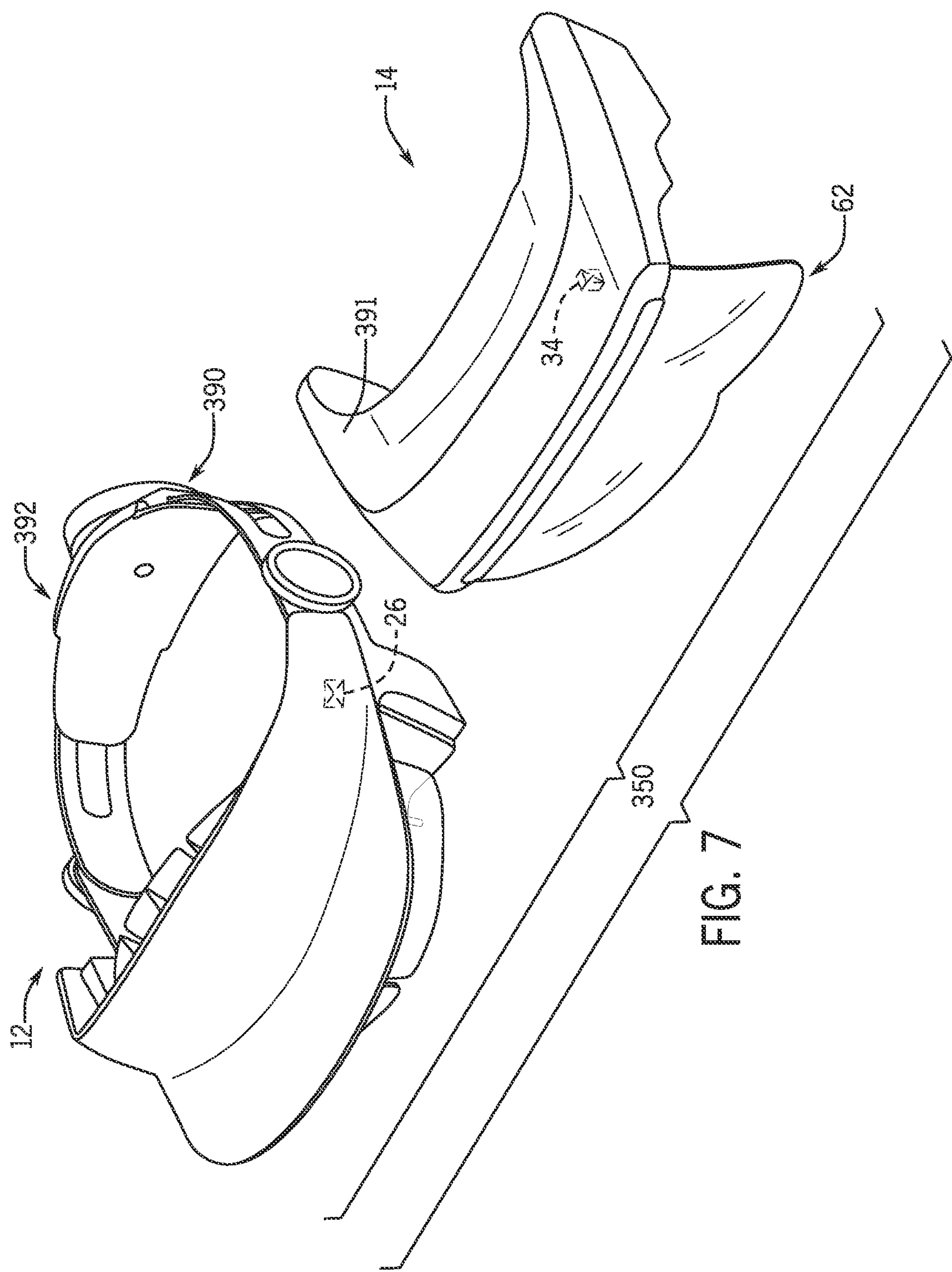

FIG. 6 is a depiction of a graphical user interface (GUI) for assigning the private audio channels for the different groups during operation of the ride, according to embodiments of the present disclosure; and FIG. 7 is a perspective view of the guest interface device and the head-mounted device of FIG. 1 of the audio distribution system, where the guest interface device and the head-mounted device are in a detached configuration, in accordance with present embodiments.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Presently disclosed embodiments facilitate assignment of one or more private audio channels in order to provide an improved audio experience for guests experiencing a particular attraction at an amusement park. The audio distribution system may receive various inputs indicative of particular desired groupings. The inputs may include preferences, such as that a particular family would prefer to be grouped together. The audio distribution system may utilize the inputs to assign a particular private audio channel to each of the particular groupings. When the private audio channels are utilized, the members of the same group can hear each other, regardless of which seats of the ride that the members of the group occupy. The private audio channels facilitate an improved audio experience for the members of a group, enabling the members to engage in conversation with one another, while excluding communications from park guests on the ride that are not part of their private audio channel.

Presently disclosed embodiments describe an audio distribution system that is communicatively coupled to a head-mounted device to facilitate the private audio channel communication. The head-mounted devices may include: (1) a head-mounted display component that is relatively costly; and (2) an adaptor or interface component, referred to as a guest interface device, that is relatively robust and that each guest may adjust to their preferred fit and that is separate from the head-mounted display. These components reversibly couple to one another to permit guest interface devices to be used with head-mounted displays. The guest interface device may include device information, such as a unique device code or identification number, that is stored or otherwise associated with the device, such as via a radio frequency identification (RFID) tag. In an embodiment, the RFID tag is read by RFID readers associated with both the audio distribution system and a head-mounted display. Guests in the attraction may be temporarily assigned a head-mounted device that may be grouped into a particular private audio channel during the attraction run via the device information. The present techniques permit grouping of these temporarily assigned head-mounted devices into one or more private audio channels based on the temporary assignments and the preferences of these assigned guests. The system is able to individually address the audio input/outputs of the head-mounted devices according to these groupings to permit private communication during the attraction.

The guest interface device may be provided to guests during queuing or at ride dispatch to provide time for fit adjustment, while the head-mounted displays are provided at a later time point, e.g., when guests are sitting on ride seats and do not have to walk or carry the relatively more fragile head-mounted displays. The distribution of the guest interface devices and head-mounted displays may be at different locations and time points. The present techniques permit rapid association of a particular head-mounted display with a guest's desired audio channel grouping based on the assignment of the guest interface device that is coupled. In this manner, the group assignment is driven by the identity of the guest interface device. Thus, guests are not required to sit in a particular assigned seat and/or together with other members of their group, so long as they retain the guest interface device that carries the identification tag that is linked to the assigned group for a private audio channel. Once seated, guests may receive head-mounted displays, which then read the identification tag and, via the guest interface device information of the identification tag, communicate to a central controller to coordinate linking of the head-mounted display to a particular private audio channel of an assigned group.

With the foregoing in mind, FIG. 1 is a block diagram of an augmented reality (AR)/virtual reality (VR) system 8 having an audio distribution system 10 that incorporates a guest interface device 12 and a head-mounted display 14 for a particular ride in a theme park. The guest interface device 12 and the head-mounted display 14 may be separate components that are coupled to one another to form a head-mounted device that is distributed to a guest as provided herein.

As illustrated, the audio distribution system includes a controller 16, e.g., a central controller, that includes one or more processors 18 and one or more memory devices 20. The one or more processors 18 may execute software programs and/or instructions to adjust display of a virtual object, assign audio channels, and so forth. Moreover, the processor(s) 18 may include multiple microprocessors, one or more "general-purpose" microprocessors, one or more special-purpose microprocessors, and/or one or more application specific integrated circuits (ASICS), and/or one or more reduced instruction set (RISC) processors. The memory device(s) 20 may include one or more storage devices, and may store machine-readable and/or processor-executable instructions (e.g., firmware or software) for the processor(s) 18 to execute, such as instructions relating to adjusting display of a virtual object. As such, the memory device(s) 20 may store, for example, control software, look up tables, configuration data, and so forth, to facilitate adjusting display of a virtual object. In some embodiments, the processor(s) 18 and the memory device(s) 20 may be external to the controller 16. The memory device(s) 20 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium).

The audio distribution system 10 also includes a reader 22 and a display or graphical user interface (GUI) 23. The reader 22 (e.g., a radio frequency identification (RFID) reader) reads identification information 24 associated with a particular head-mounted display 14 distributed to or associated with a particular guest via the guest interface device 12. The identification information may be on or part of the head-mounted display 14 or, as illustrated, the guest interface device 12, and may include a radio frequency identification (RFID) tag 26 that is positioned on (e.g., on a label or sticker), attached to, embedded into, or otherwise coupled to the guest interface device 12. The RFID tag may be a material that is reusable and inexpensive (e.g., plastic) that is easily replaceable, should the guest interface device 12 be lost, misplaced, or stolen. Of particular importance, the RFID tag 26 stores data associated with the guest interface device 12. The identification information 24 stored on the RFID tag 26 is read and interpreted by the reader 22. While embodiments of the disclosure are discussed in the context of an RFID tag, it should be understood that the device identification information of the guest interface device 12 may additionally or alternatively be provided via a barcode, visible marker, or optical transmitter providing a signal capable of being read by a reader (e.g., an optical sensor or reader).

In certain embodiments as discussed herein, the guest interface device 12 may be associated with a particular guest profile by the audio distribution system 10 to permit guest profile preferences to be applied to operation of the head-mounted display 14, such as a guest's language preferences, ride or character preferences, preferred volume settings, a closed caption preference, a group preference and so forth.

It should be understood that components of the audio distribution system 10 may be separate from one another and may be communicatively coupled. For example, the reader 22 and GUI 23 may be located at an attraction dispatch area and may pass information to the controller 16, which may be a central controller of the audio distribution system 10 and may be remote from the reader 22 and the GUI 23. The controller 16 may be in communication with other components of the system 8 or of an amusement park to receive instructions or information related to guest profiles or ride operation status. Further, the controller 16 may be communicatively coupled to the head-mounted displays 14 to control the audio channels as provided herein, e.g., via wired or wireless communication circuitry of the controller.

The audio distribution system 10 receives the identification information 24 stored on the RFID tag 26. The audio distribution system 10 may create (e.g., render), designate, or assign a first audio channel 28, a second audio channel 30, and as many additional audio channels 32 as necessary to accommodate each of the groups requested for the particular ride. As will be explained in further detail below with reference to FIG. 5, the audio distribution system 10 can assign audio channels for as few as one guest or as many guests as the particular ride will accommodate (e.g., 50 to 200 guests, etc.). In other words, the upper limit of guests that can be grouped into a single audio channel may be a function of the number of guests the particular ride accommodates on a run. In some instances, the particular audio channels will be used to group guests that came to the theme park together and that would like to experience the particular ride together, such as a family, a group of friends, a group of classmates, and so forth. The guests may self-sort into groups at the dispatch point or the guest interface device distribution point. As discussed herein, in embodiments, the system 10 may take into account the guest's preferences regarding group size, particular guests within their group, language preferences, closed captioning preferences, volume preferences, and so forth.

The audio distribution system 10 transmits data via the audio channels 28, 30, 32 to particular head-mounted displays 14 of a particular ride (ride 272, see FIG. 5), e.g., via communication circuitry of the audio distribution system 10, such as a wireless transmitter 21 or a wired communication device. Each of the head-mounted displays 14 facilitates use of the audio channels 28, 30, 32 for the corresponding group members. Each of the head-mounted displays 14 includes at least a tag reader 34 (e.g. a RFID reader), a speaker 36, a GUI and/or display 38, a microphone 40, a plurality of sensors 42 (e.g., a camera, eye tracking sensors, heart rate sensor, equipment monitoring sensors, hand tracking sensors, and the like), a controller 56, a processor 58, and/or a memory 60. The head-mounted displays 14 include communication circuitry for facilitating wired or wireless communication in the system 10, such as an antenna 46 coupled to a receiver 44, and a transmitter 47. The head-mounted displays 14 also include electronic eyeglasses 62 (e.g., goggles). When the eyeglasses 62 are inactive, the guest sees a real-world environment. In other words, the guest merely sees what he would see without wearing the eyeglasses 62 or goggles. When the eyeglasses 62 are active, virtual features in an augmented or virtual reality environment may be activated via the activated eyeglasses 62, as discussed in further detail below with reference to FIG. 7.

Returning to the AR/VR system 8 of FIG. 1, the audio input/output for a particular channel of the audio channels 28, 30, 32 may be communicated by an antenna 46 coupled to a receiver 44 of the head-mounted display 14. However, it should be understood that the head-mounted display 14 may additionally or alternatively be hard-wired via a tether and may receive wired communications. The receiver 44 picks up the audio output for the particular channel so that the wearer of the head-mounted display 14 can hear the audio output for the particular channel through the speaker 36. In an embodiment, the audio channel communication is addressed to its assigned head-mounted displays 14 such that the head-mounted displays 14 receive audio from other guests in their assigned group. In an embodiment, the head-mounted display 14 may also include noise-cancelling features that filter out other noise so that the audio for only the particular channel is heard. As may be appreciated, the ride may be a noisy environment, where music, discussion from other guests, ambient noise, and other noise sources make it very difficult to hear what another guest is saying, even when sitting in close proximity. The head-mounted display 14 reduces outside interference so that guests in the same party can hear one another and converse more easily through the head-mounted display 14.

Regardless of where the guests assigned to the particular audio channel sit on the ride, they can hear each other via the audio channel 32 through their own particular head-mounted display 14. For example, in some instances, a member of the group is more adventurous and wants to sit at the front of the ride and experience certain features of the ride sooner than another member of the group who wants to sit in the back of the ride. The member of the group in the front of the ride and the member of the group in the back of the ride will still be able to hear each other via the same audio channel 32.

If the member of the group at the front of the ride speaks into his microphone 40 and says "Watch out for the waterfall! I just got soaked!", the remaining members of his party will hear the audio regardless of where the remaining members are positioned in the ride. The private audio channel that is addressed to include the head-mounted display 14 ensures that the members of the same group can hear each other, while also not including conversations from other audio channels 32 so that the members of the same group experience are not bothered by other parties' discussion.

As discussed above, the head-mounted display 14 also includes the RFID reader 34 (or other sensing modality that is compatible with the device information on the guest interface device 12 as provided herein). The RFID reader 34 reads the RFID tag 26 that is coupled to the guest interface device 12. The device identification information from the guest interface device 12 is assigned to groups after being read by the reader 22. The guests within a particular group, while holding or wearing their guest interface devices 12, can disperse within the attraction to receive head-mounted displays 14. For example, the guests can receive the head-mounted displays 14 after they have taken their seats in a ride. As discussed, these seats do not have to be together to retain the audio channel assignment information. An individual head-mounted display 14 is coupled to a respective guest interface device 12 and receives the unique device identification information of the coupled guest interface device 12 via the reader 34. This information is communicated by the head-mounted displays 14 to the audio distribution system 10. In an embodiment, the guest interface device identification is communicated together with (bundles together) or otherwise associated with a particular identification of the coupled head-mounted display 14. The audio distribution system 10 links a particular guest interface device 12 to a particular head-mounted display 14 based on this communication. In turn, the head-mounted display 14 can then be assigned to a private audio channel based on the grouping information or the assigned group of the coupled guest interface device 12.

The head-mounted display 14 also includes the GUI and/or display 38, where the user can adjust the volume of the audio channel, change closed caption preferences, and so forth via various inputs (e.g., buttons, keyboard). The GUI and/or display 38 may also be used to display information about the ride, notifications, and the like. The head-mounted display 14 may also transmit guest data to the audio distribution system 10 via the transmitter 47. For example, the transmitter 47 may receive various signals output by the sensors 42, which may then be communicated to the audio distribution system 10 and received via a receiver 48. The sensors 42 may output signals indicative of the imagery of the surrounding environment, the sound of the surrounding environment and/or the guests' conversation, guest movement (e.g., hand movement, hand signals, etc.), biometric data (e.g., eye movement, pulse, etc.), facial movement, facial expressions, and so forth. In one embodiment, the audio distribution system 10 may adjust one or more aspects of the audio channels 32 based in part on the signals output by the various sensors 42. For example, the audio distribution system 10 may detect that the guest is going through a part of the ride that is particularly loud due to the special effects of that part of the ride (e.g., gushing water sounds from a waterfall, noise from a volcano erupting, etc.).

Figure 2:
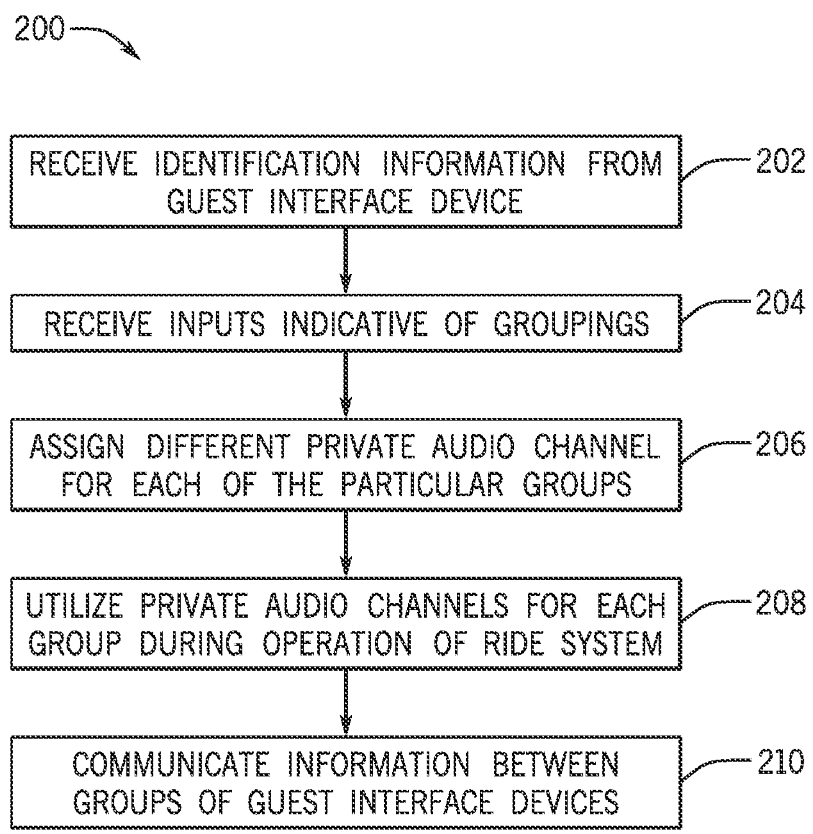
FIG. 2 is a flowchart of a process for assigning private audio channels for different groups during operation of a ride, according to embodiments of the present disclosure.

FIG. 2 is a flowchart of a process 200 for assigning private audio channels 28, 30, 32 for different groups during operation of the ride. The process 200 includes receiving (block 202) identification information from the guest interface device. The process 200 includes receiving (block 204) inputs indicative of particular groupings. For example, the inputs could provide that a particular family is grouped together, or that members of a family are grouped in specified channels (e.g., one channel for adults, one channel for children). Other inputs could include default settings for certain groups, such as disabling a group chat feature for inputs indicating a single member group, spoken language preferences for the group used for alternative audio, turning text subtitles on or off, various default settings for interactive experiences pertaining to variety for a particular ride experience, retrieval of unique guest ID information from a separate guest-tracking system, and so forth. The reader 22 may receive several inputs at once or read one input at a time in an iterative process to form the particular groupings.

The process 200 includes assigning (block 206) a private audio channel to each of the particular groups. Assigning the private audio channels involves using inputs to define each of the particular groups. The groups can be changed as circumstances change. For example, if a group member does not want to be part of a particular group anymore, or if a new member should be added to the particular group, the assignments of the private audio channels can be updated. For example, anew member can be added to an existing audio channel or a member can be removed or blocked from the audio channel.

The process 200 includes utilizing (block 208) the private audio channel for each group during operation of the ride. As discussed above, using private audio channels facilitates a sharing of the private audio channel by a particular group only. In other words, the members of the same group can hear each other, while also excluding conversations from the ride environment or other audio channels. The process 200 includes communicating (block 210) the audio information between guest interface devices that are grouped in the same private audio channel. The head-mounted devices may communicate with one another via wireless communication (e.g., Bluetooth, NFC, etc.) or via wired connection/communication. It may be appreciated that the process 200 can be repeated in full or in part to generate updated private audio channels for the ride. For example, the private audio channel can be updated when it is desired to add or remove a group member from the private audio channel.

Figure 3:
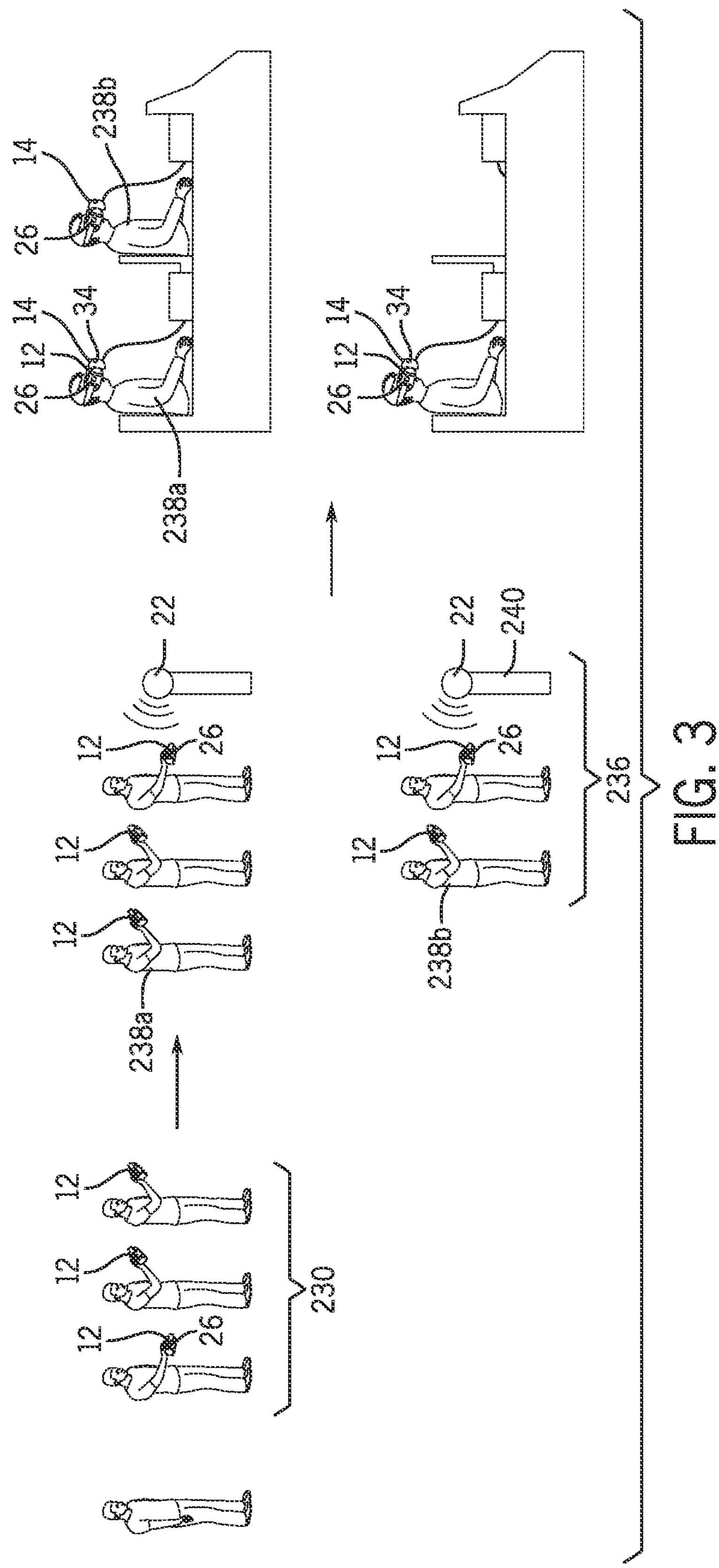
FIG. 3 is a schematic view of a process for associating guest interface devices and head-mounted devices to private audio channels, according to embodiments of the present disclosure.

FIG. 3 is a schematic illustration of a distribution and group assignment process of the present techniques. Guest interface devices 12 are distributed to guests at a distribution location 230, which may be part of a ride queue or ride dispatch area in an embodiment. The distribution may be self-directed, where each guest takes a guest interface device 12 from a repository, such a container. The distribution may be operator-mediated, whereby an operator hands the guest interface device 12 to the guest. In any case, the guest interface devices 12 may be generally randomly provided, such that any guest can receive any appropriately sized guest interface device 12. Further, each guest interface device 12 may be sized and shaped to couple to any head-mounted display 14, such that there is no pre-association of the head-mounted displays 14 with a particular guest interface device 12 before the steps of the disclosed process. In an alternate embodiment, the guest may provide their own interface device 12 that is linked to their guest profile. Subsequent to distribution of the guest interface devices 12, the guests enter a group assignment area 236. The group assignment area 236 may be co-located with the distribution location 230, such that distribution and group assignment happen generally at the same time or may be spaced apart areas. In the group assignment area 236, the device identification information on the identification tag 26 coupled to each guest interface device 12 is captured (read) according to a preferred guest grouping (e.g., a group of friends riding an attraction together) such that a group of guests is sorted into a group. A first guest **238*a* is a member of a first group and a second guest 238*b*** is a member of a second group. In an embodiment, each guest is sorted into only one group, such that the members of a group are nonoverlapping. This grouping information (e.g., group assignment) is used to establish the group assigned to a designated private audio channel.

The present techniques permit grouping and assignment without necessarily capturing guest identification information. That is, the groups may be established based on the guests self-sorting into preferred groups. These self-sorted groups may then scan the tags 26 on their distributed guest interface devices 12 using the reader 22, e.g., at a kiosk 240 or reading station, or the groups may be scanned by a handheld device that includes the reader 22, which may be controlled by an operator of the attraction. In an embodiment, the grouping process is not slowed down by guests without guest profiles having to enter their information at the point of distribution or scanning or by guests having to provide their names or other information as part of the assignment process. Further, guests are able to freely seat themselves within an attraction 250, because the grouping information is tied to the guest interface devices 12, which they take with them to their desired seats. As noted, any guest interface device 12 can couple to any head-mounted display 14. However, the system 10 has captured grouping information that is linked to particular guest interface devices 12. Thus, so long as a guest retains their guest interface device 12, the guest may sit anywhere and/or receive any head-mounted display 14 and maintain their group assignment.

The temporary assignments to groups may be directly linked to the guest interface device identification information such that the guest interface devices 12 need not store guest information. Accordingly, these assignments are able to be efficiently terminated at the end of every attraction run without having to erase or modify the information stored on the guest interface devices 12 to permit new groupings and associations for a new group of guests. Efficiency in the device distribution and dispatching process permits the attraction to operate on time and with greater throughput, thus increasing the overall guest experience and operating efficiency of the attraction. In contrast to user-controlled head-mounted devices in which a guest is able to adjust communication settings via direct inputs to the device or a controller, the head-mounted devices as provided herein may be provided or maintained by a third party, e.g., a theme park. The present techniques permit efficient temporary association of a head-mounted device to a particular audio channel group in the context of a device with limited user input capabilities.

Figure 4:
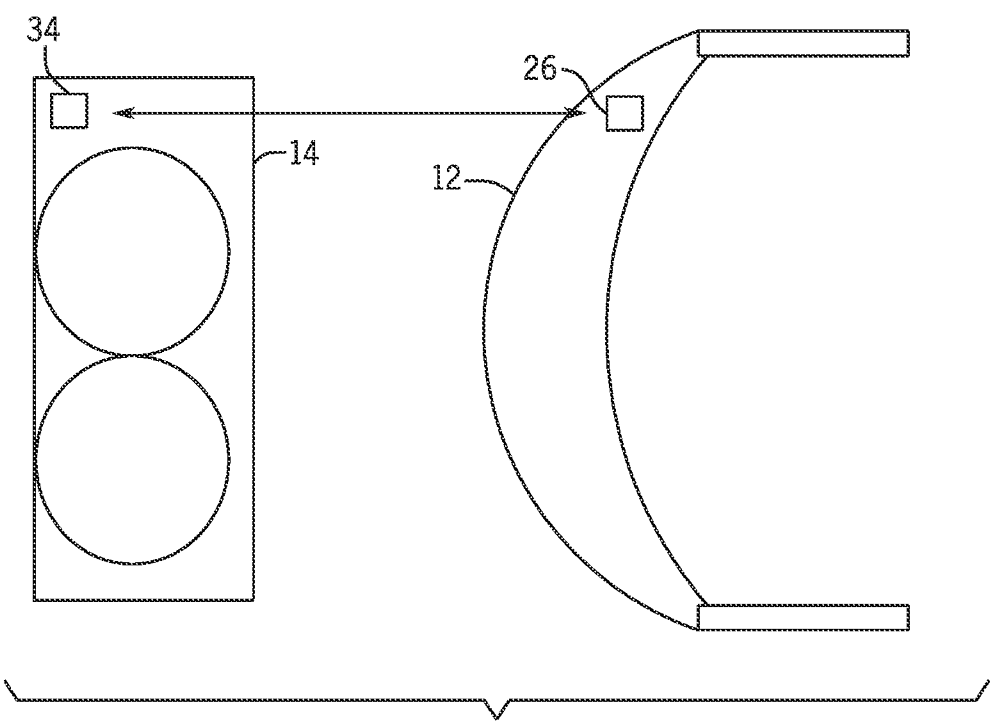
FIG. 4 is a schematic view of a head-mounted device in communication with an identification tag of a coupled guest interface device.

The captured device identification information is then provided to a central controller together with the assigned grouping information. When the guest interface device 12 couples to the head-mounted display 14, the head-mounted display reader 34 of the head-mounted display 14 reads the unique device identification from its particular coupled guest interface device 12, as shown in FIG. 4. The reading may be near field communication or contact-based, such that the reading is initiated only when the guest interface device 12 and the head-mounted device 14 are relatively close to one another to prevent reading of an uncoupled guest interface device 12 in the next seat.

Once captured by the head-mounted display 14, the head-mounted display 14 communicates both the guest interface device identification information and its own head-mounted device unique information to a controller (e.g., the controller 16, FIG. 1) in a manner that links or associates the guest interface device identification information with head-mounted device unique information. The controller then associates the head-mounted display 14 coupled to the guest interface device 12 to the correct audio group and private audio channel by looking up the group assignment of the guest interface device identification (e.g., stored in the memory 20 of the controller 16) and linking communications of the head-mounted display 14 to that group. The association of the head-mounted display 14 with the guest interface device 12 is performed at or subsequent to the coupling of these components to one another and requires no additional inputs from the guests for an efficient and user-friendly process that avoids bottlenecks and improves ride efficiency.

The tag 26 may be an active or passive tag. As discussed herein, the tag 26 may be a RFID, NFC, and/or optical barcode that is scanned by a RFID reader, a NFC reader, and/or an optical reader, respectively. The device identification information may be provided to the head-mounted display by a light emitter on the guest interface device 12 that is sensed by a detector on the head-mounted display. Each guest interface device 12 may emit light having unique modulation patterns.

Figure 5:
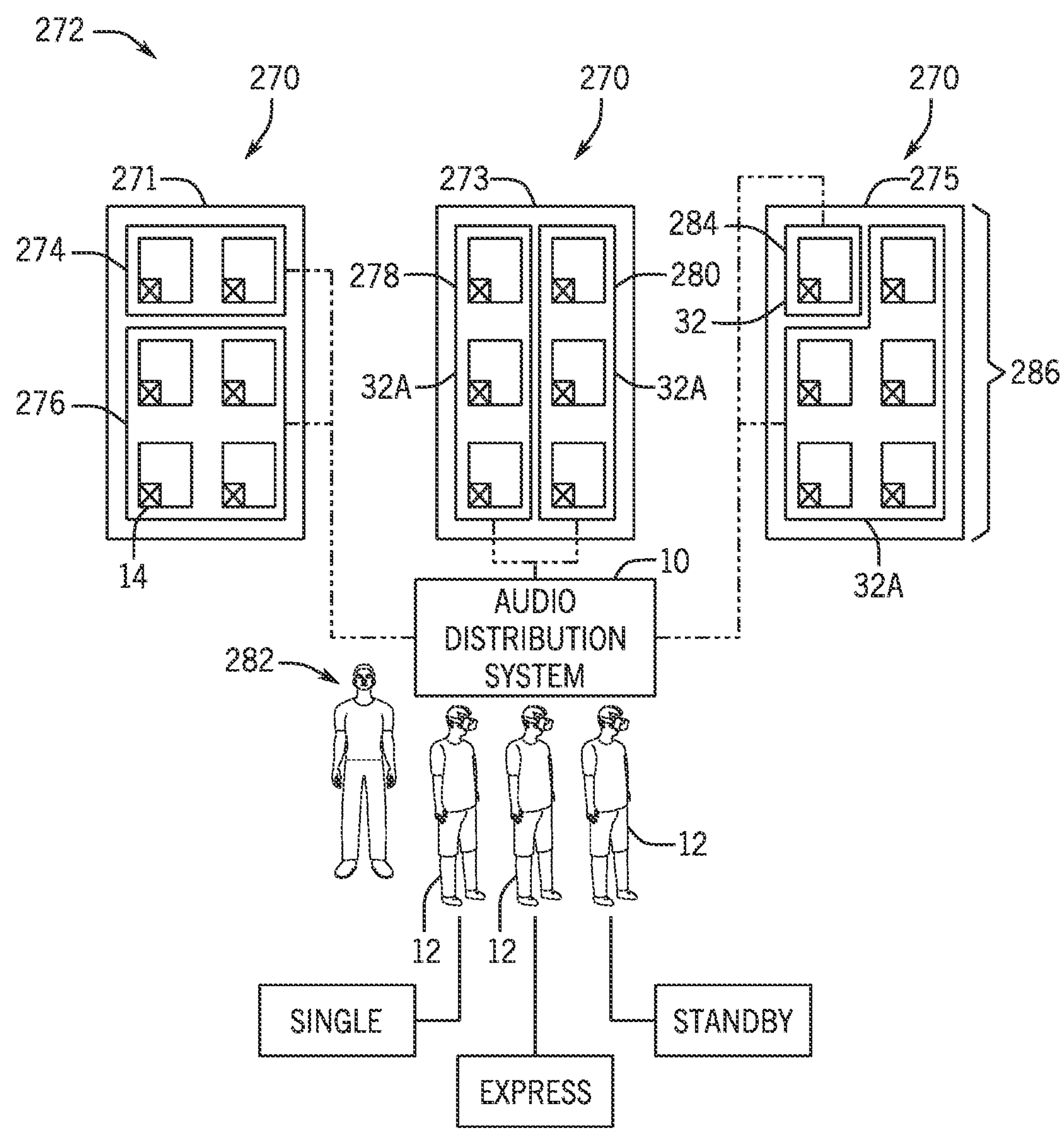
FIG. 5 is a schematic view of the different groups during operation of the ride, according to embodiments of the present disclosure.

FIG. 5 is a schematic view of the different groups associated with different private audio channels 32 during operation of the ride, according to embodiments of the present disclosure. The schematic view depicts the private audio channels 32 formed for each of the groups. As shown, each vehicle 270 of the ride 272 can include more than one audio channel 32 to accommodate different sized groups. For example, a first vehicle 271 includes two different audio channels 32 for each of the two groups in the first vehicle 271. A first group 274 of the first vehicle includes two passengers seated next to each other at one end of the first vehicle 271, while a second group 276 of the first vehicle includes four passengers in two rows of two passengers seated behind the first group 274. While the ride 272 is in operation, the first group 274 of the first vehicle 271 and the second group 276 of the first vehicle 271 cannot hear each other's private conversations that are occurring via their respective private audio channels 32. As discussed above, the audio for a first audio channel 32A associated with the first group 274 of the first vehicle 271 is received by the head-mounted display 14. The wearer of the head-mounted display 14 can hear only the audio output for the particular channel 32. As such, the head-mounted display 14 receives audio for only the particular channel 32A. The ride 272 may be in a noisy environment, where outside noise, music, other guests, and so forth can make it very difficult to hear what another guest is saying even when sitting in close vicinity. The head-mounted display 14 reduces outside interference so that guests in the same party can hear one another and converse more easily.

It may be appreciated that the private audio channels 32 work in the same manner regardless of where the members of each party are seated. Even if each member of the party is seated next to a member of a different party, as shown in Vehicle 2 (e.g., 273), the audio input/output from other channels (e.g., channels 28, 30, see FIG. 1) is not provided to those assigned to the channel 32. For example, in Vehicle 2 (e.g., 273), a first group 278 in vehicle 2 includes three passengers seated behind one another in a column, while a second group 280 in Vehicle 2 (e.g., 273) includes three more passengers seated behind the one another in a column. While on the ride 272, the guests seated next to each other may speak, shout or otherwise make noise simultaneously when the ride 72 is in operation, while still being able to hear everyone else in their private audio channel 32 even if the passenger that is seated next to him is not in their private audio channel 32. Further, the head-mounted display 14 and/or the guest interface device 12 may include noise shielding or cancelling features to block ambient or adjacent noise. The guests of a particular group 278, 280 can hear each other regardless of the number of individuals in their group or where the guests are seated on the ride 272.

In one embodiment, one-way communication from a team member 282 (e.g., ride operator) or a particular character associated with the ride 272 can be activated to allow communication from the team member 282 to the ride passengers. The one-way communication may be selectively activated so that the team member 282 can communicate a message to all of the passengers of the ride 272, to only a particular group of riders through their private audio channel 32, or to only a particular rider in the private audio channel 32. For example, the team member 282 may have reason to communicate to the entire group of passengers of the ride 72 in instances when there may be maintenance related issues, emergency situations, or other suitable reasons. In these scenarios, it may be useful for the team member 282 to engage the one-way communication from the team member 282 to the ride passengers to communicate "The ride is will need to stop in order to render aid to a passenger. Please remain seated while we assist this passenger as quickly as possible and resume operation of the ride."

In another scenario, it may be useful for the team member 282 to engage a particular audio channel 32A to communicate a message to only those members of the particular audio channel 32A. In some scenarios, it could be helpful to communicate a message to the members of the particular audio channel 32A that would apply only to the members associated with the particular audio channel 32A. In one example, the team member 282 could have need to let the group members know of an emergency for the group or communicate a change of plans for the group. For instance, the team member 282 may need to tell a group of students that are grouped in a particular audio channel a message from their school's principal (e.g., "Students of Harris Elementary School need to return to the school bus after the ride ends in order to depart the theme park.")

It could also be useful for the team member 282 to engage a particular audio channel to communicate a message to only a single member of the particular audio channel 32A. In one example, the team member 282 could have need to communicate a message to one particular guest that may require that a specific message be distributed to the single guest as shown by element 284. For instance, if a guest in the private audio channel has moved his arm outside of the vehicle 70 to touch an element (e.g., a waterfall, a rock, a character, etc.), the team member 282 can engage the one-way communication from the team member 282 to the single guest to remind the passenger of proper riding etiquette. In one example, the team member 282 could use the one-way communication to tell the single guest "Please keep hands in the vehicle." Audio channel communication may be controlled by weight/rankings of individual members based on action within the ride or pre-set preferences (e.g., by order of scanning into the group)

It may be appreciated that one-way communication between the team member 282 and the passengers may be activated for a first time period. Indeed, the team member 282 may communicate with one group (e.g., all of the ride passengers) for the first time period, such as before the ride begins so that the team member 282 may communicate specific instructions to the entire group 286. A private chat feature (e.g., the private audio channels 32) may be activated in a second time period. For example, after the ride has begun, the private chat feature may be turned on so that group members can hear each other and begin conversing with one another via their private audio channel 32.

However, the team member 282 may selectively reactivate the one-way communication with the group at a particular time outside of the first time period. Indeed, the team member 282 may reactivate the one-way communication at any point during the ride when it is necessary (e.g., in an emergency scenario).

Further, it may be appreciated that the private audio channels 32 can accommodate more passengers than a particular vehicle can hold and that the vehicle size does not limit the number of passengers in the private audio channel. For example, even though a particular vehicle associated with the ride may only hold six guests in the vehicle (e.g., Vehicle 1, 271), the private audio channel can be transmitted to guests in a separate vehicle (e.g., Vehicle 2, 273 or Vehicle 3, 275), as long as they are grouped together by the team member 282 (or by group assignment 236) into the same private audio channel. In this way, guests seated in Vehicle 1, 271 can still hear and talk to guests seated in Vehicle 2, 723 or Vehicle 3, 275 as long as they are assigned to the same private audio channel 32.

FIG. 6 depicts an example graphical user interface (GUI) 300 (e.g., that may be displayed as the GUI 23 of FIG. 1) for assigning the private audio channels for the different groups during operation of the ride, according to embodiments of the present disclosure. The GUI 300 may be displayed a handheld or portable device 302, as shown, that may be controlled by an operator, such as a ride operator, and that integrates the reader 22 (FIG. 1). The GUI 300 may be integrated into a kiosk or station (e.g., kiosk 240 of FIG. 3) with which the guests interact to self-group by scanning their guest interface devices 12. The GUI 300 may include various objects (e.g., icons, windows, buttons, drop down menus, etc.) to carry out certain commands of the audio distribution system 10. In the illustrated embodiment, the GUI 300 includes an input device, such as a selectable soft key or button 306, for the designating a group size. Once designated, the device 302 may transition to a different screen 310 that updates as the devices are read (by scanning the tags 26 via the reader 22).

The device 302 may include one or more indicators, such as audio or visual indicators associated with successful reading of the tag 26. Upon scanning of the last tag 26 in the party (corresponding to the designated party size), the audio or visual cue may shift to a characteristic completion cue to indicate that scanning is complete. The reader 22 may be triggered to activate and deactivate in conjunction with receiving user input of a party size and completion of scanning of the designated number of tags 26 in the party. The GUI 300 may also include an indication of a faulty scan, which may prompt replacement of the guest interface device 12 that includes the damaged or nonfunctioning tag 26. The GUI 300 may permit inputs or flags to select language of the group, subtitles or captioning.

FIG. 7 is a perspective view of an embodiment of the guest interface device 12 and the head-mounted display 14 of the AR/VR system 8 of FIG. 1. The guest interface device 12 and the head-mounted display 14, when coupled, form a head-mounted device 350. Each of the guest interface devices 12 in the ride 72 has a unique identification (ID) associated with the particular guest interface device 12. The unique ID may be used to identify a particular guest interface device 12. At any given time, the park may have enough guest interface devices 12 having unique IDs so that there are no repeat IDs when the park is at maximum capacity. In this way, the unique IDs ensure that the private audio channels 32 assigned by audio distribution system 10 are transmitted only to the guest interface device 12 associated with particular head-mounted displays 14. Each guest interface device 12 may be removably coupled to each of the head-mounted displays 14 via a coupling interface 13. When coupled together, the guest interface device 12 and the head-mounted display 14 may be configured to enable the user (e.g., a guest, a passenger of a ride vehicle) to experience (e.g., view, interact with) AR/VR scenes and hear passengers in his private audio channel 32.

In the illustrated embodiment, the guest interface device 12 is coupled to the head-mounted display 14 via the coupling interface 13, shown as being resident on the head-mounted display 14. However it should be understood that complementary portions of the coupling interface 13 may also be incorporated on or in the guest interface device 12. The coupling interface 13 may include an electromagnetic coupling device, a press-fit assembly, a fastener, or any other suitable coupling device. When coupled together, the guest interface device 12 and the head-mounted display 14 are in an attached configuration so that the guest interface device 12 and the head-mounted display 14 are coupled together and function as an integrated unit. The guest interface device 12 may be a replaceable device that is provided at each attraction and that is returned at the exit for the attraction. In this manner, the guest interface devices 12 may be tracked throughout the park and collected before the guest leaves the attraction by an exit scan of the identification tag 26. The exit scan may serve as a termination of the group assignment associated with the particular guest interface device 12 and the head-mounted device 14. When the guest interface devices 12 are collected, they are sanitized and inspected to ensure proper functionality. Once the guest interface devices 12 are deemed satisfactory for use, the guest interface devices 12 are put back into circulation and reused by other guests entering the park for the first time.

As discussed above, each of the head-mounted displays 14 includes at least the tag reader 34 (e.g. a RFID reader), the speaker 36, the display(s) 38, the microphone 40, and the plurality of sensors 42 (e.g., a camera, eye tracking sensors, equipment monitoring sensors, hand tracking sensors, and the like). The head-mounted display 14 also includes the electronic display 62 (e.g., AR/VR eyeglasses, goggles) that are coupled to a housing 390 of the head-mounted display 14. The electronic display 62 may be transparent, semi-transparent, or opaque in nature. In an embodiment, the electronic eyeglasses 62 may enable the guest to view a real-world environment (e.g., physical structures in the attraction) when activated with certain virtual features (e.g., AR features) overlaid onto the electronic eyeglasses 62 so that the guest perceives the virtual features as being integrated into the real-world environment. That is, the electronic eyeglasses 62 may at least partially control a view of the guest by overlaying the virtual features onto a line of sight of the guest.

In an embodiment, when implemented in the amusement park setting, the head-mounted display 14 may be physically coupled to (e.g., tethered via a cable or tether) to a structure (e.g., a ride vehicle of the amusement park ride) to prevent separation of the head-mounted display 14 from the structure. The guest interface device 12 is configured to be affixed to a head of the guest and, thus, enable the guest to comfortably wear the guest interface device 12 throughout various attractions or while traversing certain amusement park environments. For example, the guest interface device 12 may include a head strap assembly 392 that is configured to span about a circumference of the head of the guest and configured to be tightened (e.g., constricted) on the head of the guest. In this manner, the head strap assembly 392 facilitates affixing the guest interface device 12 to the head of the guest, such that guest interface device 12 may be utilized in conjunction with the coupling interface 13 to retain the guest interface device 12 on the guest (e.g., when the guest interface device 12 is engaged with the head-mounted display 14). The head strap assembly 392 may include an adjustment assembly for adjusting an inner circumference of the head strap assembly 392 to accommodate head parameters (e.g., head sizes, head shapes, hair styles) of a variety of guests to facilitate coupling the head-mounted display 14 to the respective heads of the guests.

The tag 26 may be coupled to the guest interface device 12 at a location that generally corresponds to a location of the reader 34 of the head-mounted display 14 when the guest interface device 12 and the head-mounted display 14 are coupled to one another. As shown, the tag 26 and the reader 34 may be generally on a same side after coupling. In an embodiment, the tag 26 and the reader 34 are in contact with one another when the guest interface device 12 and the head-mounted display 14 are coupled to one another. Termination of the contact or separation of the tag 26 out of range of the reader 34 may trigger deactivation of the group assignment as provided herein.

While certain embodiments are discussed in the context of the guest interface device 12, the disclosed group assignment information may be linked to other tags 26 carried by the guest. For example, the guest may wear a sticker that is scanned to designate group assignments. The sticker is then subsequently scanned by the head-mounted device 350 (which may be a single integrated unit) that is assigned to that guest to facilitate private audio channels as provided herein.

While only certain features of the disclosure have been illustrated and described herein, many modifications and changes will occur to those skilled in the art. It is, therefore, to be understood that the appended claims are intended to cover all such modifications and changes as fall within the true spirit of the disclosed embodiments.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An audio channel system comprising:

a guest interface device comprising a radio frequency identification (RFID) tag associated with the guest interface device, the RFID tag comprising encoded device identification information of the guest interface device;

a head-mounted display configured to couple to the guest interface device, the head-mounted display comprising a first RFID reader configured to read the RFID tag of the guest interface device, when the head-mounted display is coupled to the guest interface device, to receive the device identification information corresponding to the guest interface device; and an audio distribution system comprising:

a second RFID reader configured to read the RFID tag of the guest interface device to receive the device identification information of the guest interface device; and a processor configured to:

receive a group assignment of the guest interface device and associate the group assignment with the device identification information of the guest interface device read by the second RFID reader;

receive the device identification information of the guest interface device read by the first RFID reader and head-mounted display information from the head-mounted display;

upon receiving the device identification information corresponding to the guest interface device from the head-mounted display, associate the head-mounted display with the group assignment of the guest interface device;

designate a private audio channel to the group assignment; and generate instructions to transmit and receive audio between the head-mounted display and at least one other head-mounted display of the group assignment using the private audio channel.

2. The audio channel system of claim 1, wherein the guest interface device is removably coupled to the head-mounted display.

3. The audio channel system of claim 2, wherein the guest interface device utilizes a magnetic assembly or a press-fit mechanism to couple to the head-mounted display.

4. The audio channel system of claim 1, wherein the head-mounted display comprises a microphone configured to receive an audio input from a guest.

5. The audio channel system of claim 4, wherein a signal associated with the audio input is not decoded by head-mounted displays not associated with the group assignment.

6. The audio channel system of claim 1, wherein the second RFID reader is integrated into a kiosk that scans the guest interface device while the guest interface device is not coupled to the head-mounted display.

7. The audio channel system of claim 1, wherein the RFID tag of the guest interface device and the first RFID reader are in contact with one another when the guest interface device is coupled to the head-mounted display.

8. A method for managing one or more private audio channels, the method comprising: receiving guest interface device identification information encoded in a radio frequency identification (RFID) tag associated with a guest interface device, wherein the guest interface device identification information is read by a first RFID reader configured to read the RFID tag to receive the guest interface device identification information associated with the guest interface device; assigning the guest interface device identification information read by the first RFID reader into an assigned group; receiving head-mounted device identification that indicates that a head-mounted device is coupled to the guest interface device and the guest interface device identification information read by a head-mounted device second RFID reader of the head-mounted device, wherein the head-mounted device second RFID reader is configured to, when the head-mounted device is couple to the guest interface device, read the guest interface device identification information; associating the head-mounted device with the assigned group; designating a private audio channel for the assigned group; and communicating audio signals between the head-mounted device and other head-mounted devices in the assigned group via the designated private audio channel such that the head-mounted device and the other head-mounted devices are capable of two-way communication with one another.

9. The method of claim 8, comprising:

receiving additional guest interface device identification information read by the first RFID reader from an additional RFID tag associated with another guest interface device; and adding the additional guest interface device identification information from the additional RFID tag to the assigned group.

10. The method of claim 8, comprising:

receiving an input specifying a party size; and initiating activation of the first RFID reader to read the RFID tag and additional RFID tags of additional guest interface devices to receive guest interface device identification information from the RFID tag and additional RFID tags corresponding to a number of the party size.

11. The method of claim 8, wherein the head-mounted device identification is received from the head-mounted device and bundled with or linked to the guest interface device identification information of the coupled guest interface device.

12. The method of claim 8, comprising:

receiving a communication from a different head-mounted device;

determining that the different head-mounted device is in the assigned group; and transmitting the communication to the head-mounted device via the designated private audio channel.

13. A head-mounted device comprising:

a guest interface device comprising an identification tag encoding guest interface device identification information; and a head-mounted display configured to couple to the guest interface device, the head-mounted display comprising:

a reader configured to read the guest interface device identification information from the identification tag;

communication circuitry configured to, when the head-mounted display is coupled to the guest interface device, transmit the guest interface device identification information read by the reader of the head-mounted display and head-mounted device identification to a controller to assign the head-mounted device into a group of head-mounted devices based on a group assignment associated with the guest interface device, wherein the group assignment is formed based on the guest interface device identification information read by an additional reader configured to read the guest interface device identification information from the identification tag;

a microphone configured to receive audio inputs of a private audio channel, wherein the private audio channel is designated for the group of head-mounted devices; and a speaker configured to output audio signals of the private audio channel.

14. The head-mounted device of claim 13, wherein the identification tag is a sticker applied to the guest interface device.

15. The head-mounted device of claim 13, wherein the identification tag is positioned on the guest interface device to be in contact with or proximate to the reader when the guest interface device is coupled to the head-mounted display, wherein the group assignment is maintained while the guest interface device is in contact with or proximate to the reader.

16. The head-mounted device of claim 13, wherein the reader and the additional reader are near field communications readers and the identification tag is an RFID tag.

17. The head-mounted device of claim 13, wherein the head-mounted device is coupled to a ride vehicle via a tether, and wherein the tether communicates the guest interface device identification information, the head-mounted device identification, and the audio signals.

18. The head-mounted device of claim 17, wherein the head-mounted device is individually addressable via the tether to output and receive the audio signals.

19. The audio channel system of claim 1, wherein the processor is configured to:

receive an exit scan of the guest interface device; and terminate the group assignment based on the exit scan.

20. The audio channel system of claim 1, wherein the head-mounted display comprises an electronic display configured to adjust display of virtual features specific to the group assignment in an augmented or virtual reality environment.

* * * * *